United States Patent [19]
Whitby

[11] 4,297,723
[45] Oct. 27, 1981

[54] WIDE ANGLE LASER DISPLAY SYSTEM
[75] Inventor: Clyde M. Whitby, Duncanville, Tex.
[73] Assignee: The Singer Company, Binghamton, N.Y.
[21] Appl. No.: 107,686
[22] Filed: Jan. 28, 1980
[51] Int. Cl.³ .............................................. H04N 9/31
[52] U.S. Cl. ........................................ 358/60; 358/87
[58] Field of Search ....................... 358/60, 61, 62, 63, 358/87, 104, 231, 232, 233, 236

[56] References Cited
U.S. PATENT DOCUMENTS
3,864,730  2/1975  Roth ..................................... 358/60
3,909,525  9/1975  Fagan .................................... 358/87
3,992,718 11/1976  Driskell ................................ 358/61

Primary Examiner—Richard Murray
Attorney, Agent, or Firm—Stephen C. Kaufman; J. Dennis Moore; Jeff Rothenberg

[57] ABSTRACT

A projected light beam video image display system. The displayed scene is presented in contiguous scene parts which form a single scene. Modulated beams for each scene part are generated and simultaneously scanned in the pattern of a TV raster for each. The beams are projected onto a viewing surface through a beam separator which separates the beams such that each beam scans a separate scene part in appropriate location on the viewing surface to form the single scene.

4 Claims, 6 Drawing Figures

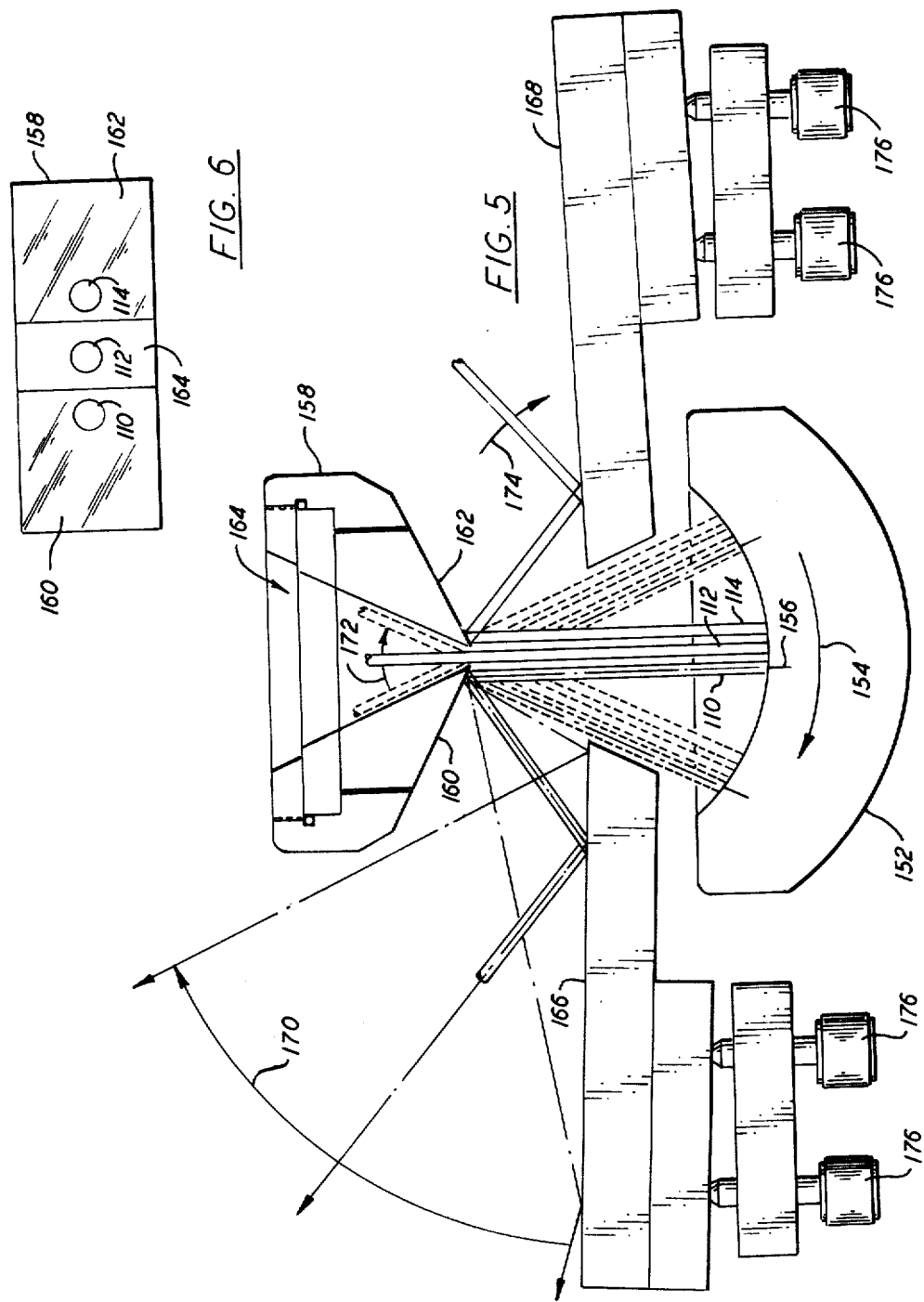

WIDE ANGLE LASER DISPLAY SYSTEM

TECHNICAL FIELD

The present invention relates to video display systems, and more particularly relates to projected light beam display systems.

BACKGROUND ART

The vehicle simulator art, and in particular the aircraft simulator art, has reached a state of impressive sophistication. This is evident, for example, in the dependent disciplines of motion systems, auxiliary haptic sensory cueing devices (e.g., G-Seats), and faithful cockpit environmental reproduction. Consequently, flight simulators have in the recent path been utilized in connection with such demanding applications as tactical fighter pilot air-to-air combat training.

A related dependent discipline, also sophisticated but in need of improvement, is the visual simulation art. While enormous strides have been taken in the area of image generation, particularly in digital image generation techniques, display systems have fallen short in viewing angle characteristics.

The most typical such simulator visual system utilizes a high resolution CRT and collimating optics. However, in order to meet brightness and resolution requirements, the total displayed field of view permitted by a single CRT is limited to typically 48° horizontal and 38° vertical. Prior attempts to extend this field of view to accommodate the demands of tactical training applications utilized the technique of providing a mosaic of CRT display packages. It has been discovered, however, that this represents a less than totally satisfactory solution, as it inevitably results in compromises arising from optical considerations and mechanical interference between adjacent displays manifested as gaps in the field of view. Such a system also presents a limited exit pupil, requiring low intensity lighting in the simulator cockpit. Further, the maintenance problems associated with matching and aligning such a complex of separate displays are formidable.

TV projectors have been used with some success, particularly in connection with "dome" type displays in which the display screen takes the form of a spherical dome surrounding the simulator cockpit. Perhaps the most suitable such projector available heretofore has been the light valve projector. A commercially available 1,000 lines version was especially developed, in fact for the flight simulation industry. Although visual display systems incorporating this projector are free from some of the problems inherent in the CRT/collimating optics approach, they still do not represent a fully acceptable answer to the wide angle display requirement. Currently available light valve projectors exhibit, for example, vignetting and edge distortion that makes it impossible to achieve a continuous quality image. In addition, such systems require that three or more projectors be located on a single simulator fuselage. Presently in development for display applications is the liquid crystal light valve. While this possesses the potential for significant improvements both in light output and image uniformity, devices demonstrated thus far have exhibited lag and poor contrast ratio. Further, for wide angle display applications, multiple displays, with their attendant difficulties as previously discussed, would still be required.

The most promising approach to the wide angle display problem appears to be in the use of laser projectors. In such systes, a laser beam is generated and intensity modulated with video information, typically by means of an acoustooptic cell, and then scanned in the pattern of a raster onto a display surface, such as a screen. Such systems provide much improved brightness over previous systems, due to the high intensity inherent in laser light. In addition, the mechanical scanning devices employed in such systems permit a continuous wide angle view to be scanned onto a display surface. For example, U.S. Pat. No. 3,992,718 entitled "Color Panoramic Laser Projector" which issued Nov. 16, 1976 to Carl R. Driskell, disclosed a laser projector display system which provides a continuous 360° image, completely surrounding the viewer.

However, the "brute force" approach of simply stretching the scanning window to the desired wide angle size revives resolution problems. A field of view of even 175° by 75°, for example, if it is to provide the resolution which is demanded in modern flight simulator applications, requires that the system operate with a bandwidth of approximately 100 MHz. This places severe design demands on the modulator system, and poses the further problem of incompatibility with the digital image generation system employed in the simulation art.

The present invention solves these problems and, by virtue of a novel and ingenius optical scheme which permits, for example, a 140°×48° field of view scanned laser image possessing requisite resolution, to be generated by means of a system having a bandwidth of less than 40 MHz.

DISCLOSURE OF INVENTION

According to the present invention there is provided a scanned light beam video display apparatus for use with a viewing surface, in which three groups of a plurality of light beams are generated. Each group of beams is composed of substantially monochromatic light of a different one of the three primary colors. These groups of video signals are also generated, each group corresponding to a different one of the three color video channel signals, each of the plurality of signals within each group corresponding to a different one of a corresponding plurality of contiguous scene parts to be viewed. A corresponding further plurality of light intensity modulators, such as acousto-otpic modulators, are disposed in the path of the light beams and are excited according to the video information in the video signals. The modulated light beams are then combined so that the beams corresponding to the three different channels of a particular scene part are merged to form a single, composite, intensity modulated light beam for that scene part. Each of these composite beams are projected, in parallel space relation, to a single optical scanner which scans simultaneously each of the composite beams in the pattern of a TV raster. The parallel scanned beams are relayed by way of a lens system to a beam separater. The lens system projects the beams through this separater which spatially separates each of the scanned composite beams so that the scene parts are scanned contiguously onto the viewing surface forming a single wide angle scene.

The present invention also contemplates a simpler, monochromatic wide angle display system, in which case instead of three groups of light beams there would be simply one.

BRIEF DESCRIPTION OF THE DRAWINGS

FIG. 4 is an optical diagram of a relay lens and projection lens system constructed according to the principles of the present invention; while FIG. 5 is a partial top view of a beam separator constructed according to the principles of the present invention; and FIG. 6 is a front view of the beam separator of FIG. 5.

BEST MODE OF CARRYING OUT THE INVENTION

Figure 1:
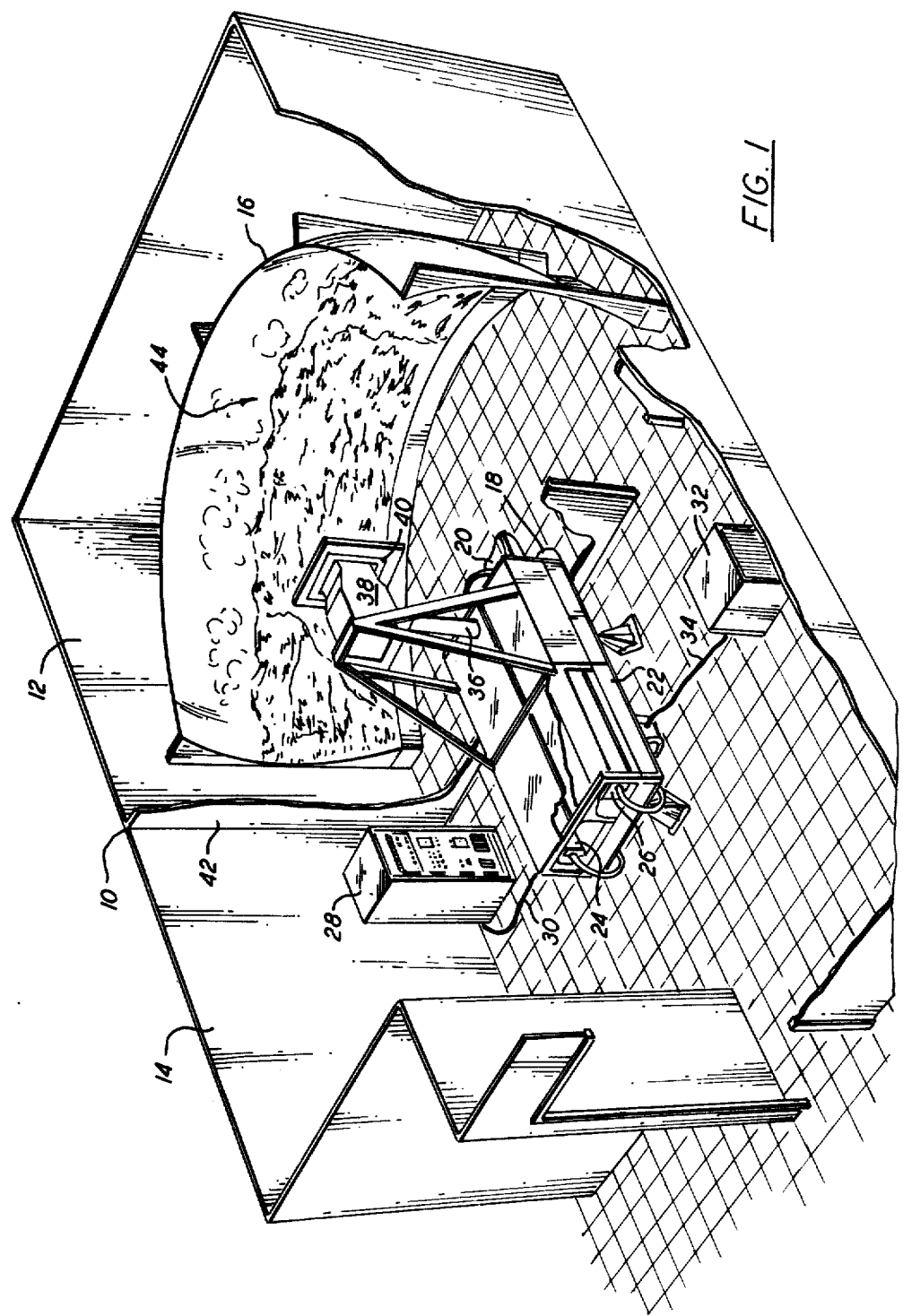
FIG. 1 is an orthogonal cutaway view of the layout for a scanned laser projection system constructed according to the principles of the present invention.

FIG. 1 shows a partial cutaway orthogonal view of the preferred embodiment of the present invention. The room 10 in which the system is enclosed is divided into two parts, a view room 12 and a component room 14. In the viewing room 12 a large spherical-type screen 16, constructed according to known principles, surrounds a viewing location 18 at which a chair is located for a viewer.

In the component room 14 there is located a laser table 22, on which is located the laser generators 24, 26, and related optical devices to be discussed hereinafter. A cabinet 28 contains view and other drive circuitry, also to be described hereinafter. The electronics within cabinet 28 is connected to the laser table 22 by way of a cable 30, as shown. The power supplies for the laser table may be located in another cabinet 32 which may be connected to the laser table 22 by way of a second cable 34, as shown.

The scanned beam from laser table 22 is relayed to an output wide angle lens and beam separator by way of relay lenses contained in tube 36. The output wide angle lens is housed in enclosure 38. This enclosure 38 protrudes through an opening 40 in the divider wall 42. The projected and separated beams are scanned onto the viewing surface 16 to form the image 44 of the scene to be viewed, as shown.

It is to be understood that the view of this particular layout is intended to provide the reader a general idea of the nature of the invention which is being described and not to suggest any specific limitations. For example, it is not essential that the scanned beam be projected through relay optics arranged in a vertical configuration as is depicted by tube 36. Such is a design expedient selected, in the embodiment shown, to accommodate a low, physically stable laser table and a projection output located as shown. In fact, as was suggested earlier, it is intended that the instant invention be suitable for use in conjunction with a flight simultator. In such case the screen would be fixedly mounted with respect to the cockpit, as would the output projection lens and separator. Suitable transmission means would be provided to transmit the modulated beams to the simulator platform, as, e.g., an optic fiber bundle or servo driven mirror assembly. These considerations are, however, unique to each particular application and are well within the scope of an ordinarily skilled visual system artisan once the principles of the present invention are understood.

Figure 2:
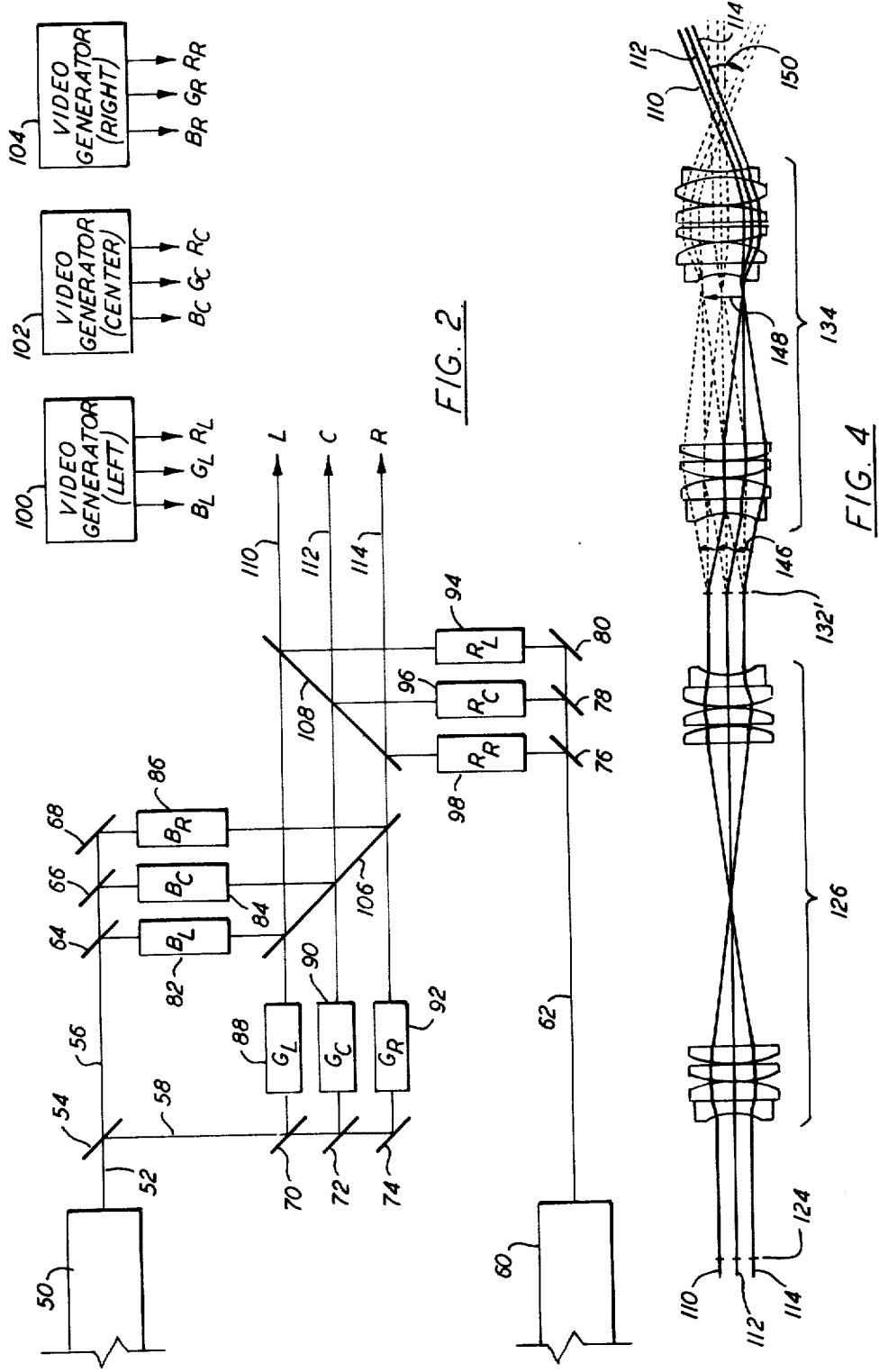
FiG. 2 is a block diagram of a color, laser beam intensity modulator system.

Turning now to FIG. 2, there can be seen a block diagram of a laser generator and video light intensity modulator, as well as beam combiners for combining and parallelizing the various beams to be scanned, all constructed according to the principles of the present invention. In the preferred embodiment, a standard, commercially available argon laser 50 is used to generate strong blue and green laser light components. These emerge in an output laser beam 52 which passes through a dichroic mirror 54 which splits the beam into two components, a first component 56 containing mostly blue laser light and a second component 58 containing mostly green laser light.

A standard, commercially available krypton laser 60 is used to generate a laser beam 62 having a predominant component in the red region.

It is to be noted at this point that the preferred embodiment contemplates a tripartite color image generation system in which the scene to be viewed is divided into a left, a center and a right part. Each of the three primary color laser beams, 56, 58, 62, passes through two beamsplitters oriented at 45° angle to their path and are finally reflected by a mirror, also oriented at a 45° angle to their path. The beamsplitter/beamsplitter/mirror combination divides each beam into three equal components, one each for each scene part, or segment. Thus can be seen for the blue laser beam 56 such a combination 64, 66, 68, while for green the combination comprises elements 70, 72, and 74, and for 8 red 76, 78, and 80.

Each such group of divided beams is fed to a corresponding group of light beam intensity modulators, such as acousto-optic modulators which are well known in the art. One of the beams in the group is fed to a modulator corresponding to one color channel, for the left part of the scene to be viewed, while another to a modulator for that color channel for the center part of the scene to be viewed, and the third of the group will be sent to the corresponding modulator for the right part of the scene. Thus, there can be seen that for the blue laser light beams, there are provided a left scene part blue video channel modulator 82, a center scene part blue channel video modulator 84, and a right scene part blue channel video modulator 86. Corresponding modulators for the green channel are identified by reference numerals 88, 90, 92, respectively, while for the red channel these modulators are identified by reference numerals 94, 96, and 98, respectively.

Video signals for the aforementioned modulators are provided by three video generators 100, 102, and 104, corresponding to the left, center and right parts of the scene to be viewed, respectively. These generators may be any one of the many standard types available, with the proviso that their video information correspond to each of three contiguous scene parts. The outputs of these generators are identified in the drawing by the channel color letter and scene portion subscript. Thus the left scene part blue video channel output is identified by the symbol, "$B_L$." This output is fed to acousto-optic modulator 82 identifiedied also with the corresponding "$B_L$" symbol. The corresponding matchups for the remaining video signals and modulators may be made similarly.

The three video modulated beams for each scene portion are joined to form three composite video intensity modulated laser beams corresponding to the left, center, and right scene portions, respectively, by means of two beam combiners 106, 108, oriented as shown. As can be seen, these beams 110, 112, 114, emerge from the modulator/combiner in a parallel space relation. Using a standard commercially-available argon-type laser for blue/green laser line generation and a standard commercially-available krypton laser for red light beam generation, and also using standard commercially-available acousto-optic type modulators the output beams 110, 112, 114, will have a beam diameter of approximately 2.5 millimeters. The modulators and beam combiners are arranged so that the transmission axes of the three beams are coplanar and the center-to-center spacing of the beams is approximately 3.5 millimeters. This configuration places a demand on the subsequent optics in the system such that a total equivalent pupil of approximately 9.5 millimeters by 2.5 millimeters be accommodated.

Figure 3:
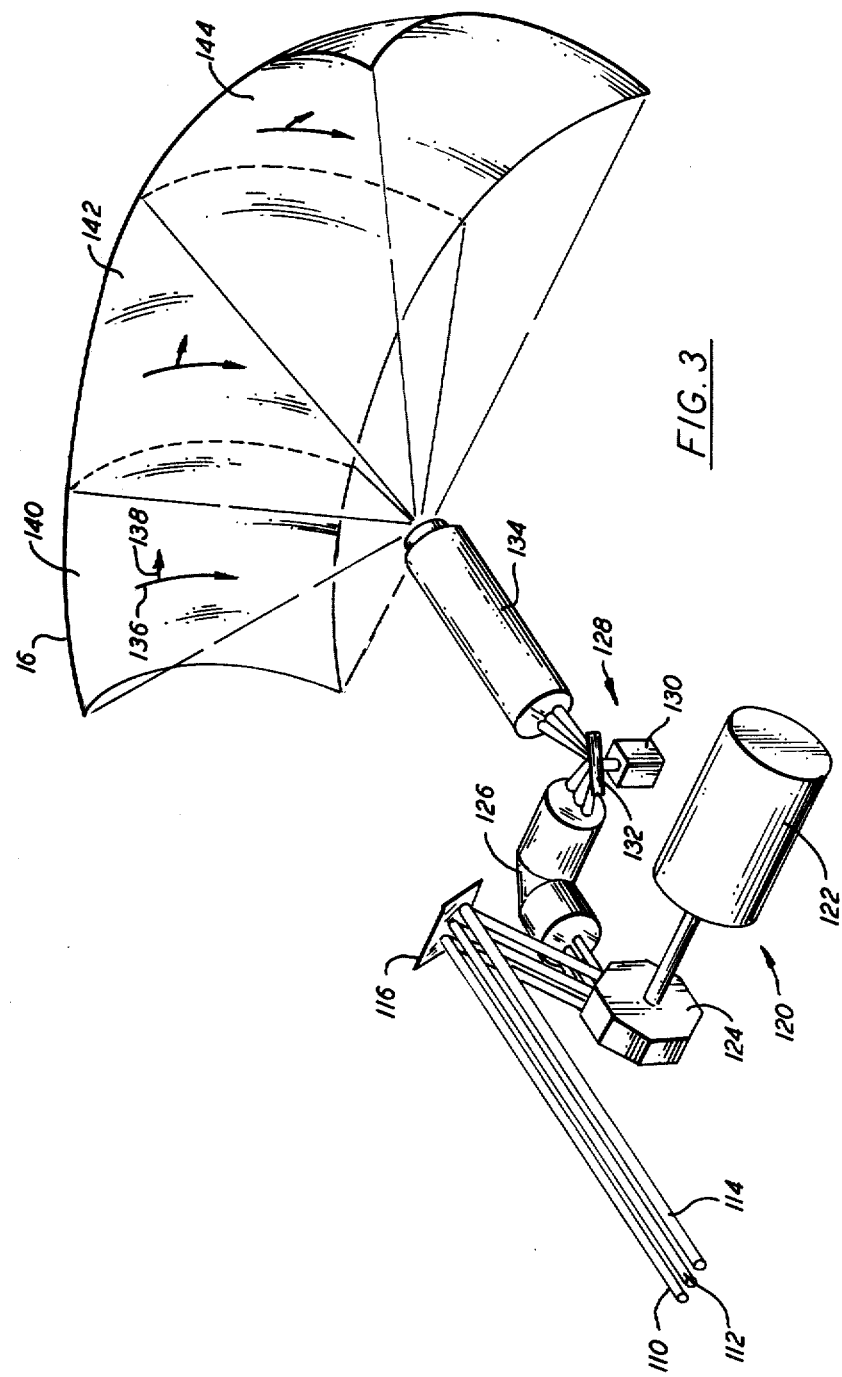
FIG. 3 is a partial orthogonal view of scanning and projecting elements constructed according to the principles of the present invention.

FIG. 3 shows a partial view of the remainder of the system of preferred embodiment of the present invention. The three composite beams 100, 112, 114, can be seen entering from the left where they are reflected from a reflection mirror 116, to a single scanning light beam system which includes a vertical scanner 120 in series with a horizontal scanner 128. Scanner 120 comprises a very high speed synchronous motor 122 with a polygon mirror 124 mounted on its shaft. The preferred embodiment contemplates a twenty-four facet mirror rotating at 76,500 RPM to obtain 30,600 scan lines per second for a 950 line field scanned at 30 frames per second, but interlaced to produce an equivalent 60 frames per second. Such a high speed device requires such design features as a beryllium shaft and polygon, and frictionless air bearings. These construction techniques are well known, and devices such as this are commercially available from, e.g., Speedring Corp., of Warren, Mich.

The three beams 110, 112, 114 are fast-scanned vertically through a sweep angle of about 19°. They are then relayed by way of a right angle 1:1 relay lens 126, designed according to well-known pupil relay principles, to a horizontal low-speed scanner 128 comprising a conventional galvanometer 130, such as a G-100PD, manufactured by General Scanning, Inc., of Watertown, Mass., which drives a mirror 132 in response to a ramp waveform drive signal generated according to well-known synchronized scanner signal generation techniques.

The horizontal scanner 128 scans the vertically scanned beams 110, 112, 114 at a rate of 60 Hz through a horizontal angle of approximately 19°, completing a 19° by 19° raster scan, reflecting them to a projection lens system 134. In other words, the pupils of the three beams are relayed by relay lens system 128 to projection lens system 134 by way of mirror 132, which also horizontally scans them.

The projection lens system 134 is designed to perform two functions. First, it operates as a scan angle magnifier by about 2.5×, expanding the raster scan angle range to about 48°×48°. This also results in pupil demagnification by 2.5×, to about one millimeter for each pupil. Second, it focuses the beams at a distance of about 10 feet, the distance away from the screen 16. The beams are projected onto the screen 16 where they are vertically and horizontally scanned, as indicated by arrows 136 and 138, in three separate but contiguous scene parts 140, 142, and 144, as shown.

A simplified optical diagram of the lens and scanning system just described is presented in FIG. 4. The unfolded relay lens 126 and the projection lens system 134 can be seen. The locations in the system of vertical scanner 124 and horizontal scanner 132 are shown as primed references 124' and 132'.

Beams 110, 112 and 114 enter from the left and pass to location 124' where they are scanned vertically, which in this view is in and out of the plane of the drawing. The vertically scanned beams are then relayed via lens system 126 to the horizontal scanner location 132' where they are scanned horizontally as depicted by arrows 146. The beam location at leftmost scan angle is indicated by bold lines, while center and rightmost scan locations are depicted in lighter lines, as shown.

The resultant raster-scanned beams enter the projection lens systems 134, which relays them by known pupil relay principles at a pupil demagnification of 2.5×. Arrow 148 indicates the direction of travel of the beam focal point in the focal plane of system 134 as the beams are scanned. Beams 110, 112 and 114 can be seen emerging from the projection lens system 134 at a 2.5× magnified scan angle while being scanned is indicated by arrow 150.

FIG. 5 shows a top view of the novel means of beam separation utilized in the preferred embodiment of the present invention. Lens 152 is the final output lens of projection lens system 134 (FIGS. 3, 4). The three raster scanned beams 110, 112 and 114 can be seen emerging therefrom while being scanned as depicted by arrow 154. The beams are shown in solid lines at the centermost scan angle while the most extreme scan angles are depicted in dashed lines. Beam 110, for the left scene part, is provided with a center axis line 156 to facilitate tracing beam 110 path through its scanning. The right hand beam 114 undergoes the same reflections as the left hand beam 110, but in the opposite direction.

Mounted in front of lens 152 is a novel beam separator 158, shown also in FIG. 6 in front view. This separator 158 comprises two mirror surfaces a left 160 and a right 162 positioned as shown in FIG. 5 and having an opening 164 between them. The separator 158 is positioned substantially at the point where the emergent beams "pivot" in their scanning, such that the two outer beams 110, 114, strike respective mirror surfaces 160, 162, at substantially the same location regardless of instantaneous scan angle, while the center beam always passes through the opening 164, as shown in both FIGS. 5 and 6.

Associated with separator 158 is a pair of larger, forward-reflecting mirrors 166 and 168, on the left and right, respectively, of the separator, as shown. Their function is to reflect forward to the screen 16 the backward reflected beams from separator 158, as shown in FIGS. 3 and 5. Arrows 170, 172 and 174, in FIG. 5, shows the direction of beam scanning in the horizontal direction. Adjustment knobs 178 permit the mirrors 166, 168, to be accurately aligned to join the three scene parts into one continuous scene.

One final note, the optics should be designed with care to minimize aberration and optomize the Modulation Transfer Function of the various optical systems. The lenses should have good resolution in the three pupil areas, and the output pupil should be stable with an input modulated beam scanned over the required scan angle range. In this way the three scene parts can be made to mate with minimum noticeable disjunction. Optical design principles addressing these considerations are well known.

Thus, there has been presented the preferred embodiment of the present invention. Other designs and modifications will suggest themselves to the ordinary skill practitioner of the art once the principles of the invention are understood. For example, the scene might be divided into four parts, and then not necessarily linear in relationship. Appropriate mirror configurations would effect the final beam separation. Also, prisms instead of mirrors would be used in the separator. It is intended that the claims cover these and all other embodiments as fall within the scope of the invention described herein.

What is claimed is:

1. A scanned light beam video display apparatus for use with a viewing surface, comprising:
   (a) light means for providing three groups of light beams, each group comprising a plurality of beams of substantially monochromatic light such that the light of each group corresponds to a different one of the three primary colors;
   (b) video means for providing three groups of video signals, each group comprising a plurality of primary color video channel signals, such that each group of signals corresponds to a different one of the three color video channels for a plurality of contiguous scene parts to be viewed;
   (c) light modulation means associated with said light means and said video means and responsive to said three groups of video signals for intensity modulating said three groups of light beams in accordance with the video information contained in said signals to produce three groups of intensity modulated light beams, each group of modulated beams comprising a plurality of beams of substantially monochromatic light corresponding to a different one of the three primary colors, each of said plurality of beams within each said group being intensity modulated in accordance with the video information of one of the three color video channels for a different one of said plurality of contiguous scene parts to be viewed;
   (d) light combining and parallelizing means for combining said three groups of modulated light beams such that each of said modulated beams corresponding to the channels of each one of said contiguous scene parts is combined so as to form composite beams of video intensity modulated light for raster scanning to form each of said contiguous scene parts, thereby producing a plurality of said composite beams in parallel relationship;
   (e) single scanning means for scanning simultaneously said plurality of parallel composite beams in the pattern of a TV raster for each;
   (f) projection means for projecting said plurality of raster scanned composite beams onto the viewing surface; and
   (g) beam separation means for spatially separating said projected plurality of raster scanned composite beams such that said separated beams raster scan said scene parts contiguously onto the viewing surface to form a single continuous scene.

2. The apparatus of claim 1 wherein the number of scene parts is three, said projection means projects said beams such that said beams each pivot about a different pivot location in space between said projection means and said screen, and said separation means comprises redirect means located at each of said different locations for directing each of said beams in a different direction in space, such that said beams scan separate but contiguous rasters onto the viewing surface.

3. The apparatus of claim 2 wherein said scene parts are contiguous and arranged linearly, and said redirect means comprises:
   (a) a first pair of mirrors spatially separated such that a gap exists between them, disposed such that the two mirrors intercept two of said scanned beams at their said pivot location, while the pivot location of the third of said beams is located in said gap; and
   (b) a second pair of mirrors disposed in the paths of the two beams refelected from said first pair of mirrors for rereflecting said beams onto the viewing surface.

4. A scanned light beam video display apparatus for use with a viewing surface, comprising:
   (a) light means for providing a plurality of light beams;
   (b) video means for providing a plurality of contiguous scene parts to be viewed;
   (c) light modulation means associated with said light means and said video means and responsive to said video signals for intensity modulating said plurality of light beams in accordance with the video information contained in said signals such that each of said plurality of beams is intensity modulated in accordance with the video information of a different one of said plurality of contiguous scene parts;
   (d) light parallelizing means to arrange said plurality of intensity modulated light beams in a parallel space relationship;
   (e) single scanning means for scanning simultaneously said plurality of parallel beams in the pattern of a TV raster for each;
   (f) projection means for projecting said plurality of raster-scanned composite beams onto the viewing surface; and
   (g) beam separation means for spatially separating said projected plurality of raster-scanned beams such that said separated beams raster scan said scenes to be viewed contiguously onto the viewing surface to form a single continuous scene.

* * * * *